United States Patent [19]
Yamaguchi et al.

[11] Patent Number: 6,068,713
[45] Date of Patent: May 30, 2000

[54] HYDROGEN ABSORBING ALLOYS AND PROCESS FOR PRODUCING SAME

[75] Inventors: Masaharu Yamaguchi, Kyoto; Haruyuki Inui, Takatsuki; Koichi Sato, Itami; Koichi Nishimura, Suita; Shin Fujitani, Hirakata; Ikuo Yonezu, Hirakata; Koji Nishio, Hirakata, all of Japan

[73] Assignee: Sanyo Electric Co., Ltd., Moriguchi, Japan

[21] Appl. No.: 08/868,834

[22] Filed: Jun. 9, 1997

[30] Foreign Application Priority Data

Jun. 11, 1996 [JP] Japan .................................. 8-172995

[51] Int. Cl.$^7$ .............................. B22F 9/04; H01M 4/38
[52] U.S. Cl. ......................... 148/513; 148/426; 420/900
[58] Field of Search .................................... 148/513, 331, 148/426; 420/455, 900

[56] References Cited

U.S. PATENT DOCUMENTS

| | | | |
|---|---|---|---|
| 5,616,432 | 4/1997 | Ovshinsky et al. | 420/900 |
| 5,679,130 | 10/1997 | Lee et al. | 420/900 |
| 5,810,981 | 9/1998 | Komada et al. | 420/900 |

FOREIGN PATENT DOCUMENTS

| | | |
|---|---|---|
| 49-34315 | 9/1974 | Japan . |
| 59-28626 | 7/1984 | Japan . |
| 61-10543 | 3/1986 | Japan . |

OTHER PUBLICATIONS

H. Okamoto, La–Ni Phase Diagram, Journal of Phase Equilibria, 12(5), 1991.

*Primary Examiner*—George Wyszomierski
*Attorney, Agent, or Firm*—Armstrong, Westerman, Hattori, McLeland & Naughton

[57] ABSTRACT

A hydrogen absorbing alloy is provided which is increased in reaction rate without being restricted in composition and which is unimpaired in the reversibility of reaction and hydrogen absorption-desorption cycle life characteristics. The alloy contains the phase of an intermetallic compound of the composition A5T19 wherein A is at least one element selected from the group consisting of La, Ce, Pr, Sm, Nd, Mm (misch metal), Y, Gd, Ca, Mg, Ti, Zr and Hf, and T is at least one element selected from the group consisting of B, Bi, Al, Si, Cr, V, Mn, Fe, Co, Ni, Cu, Zn, Sn and Sb. The alloy is produced by mixing together an alloy containing an AT3 phase and an alloy containing an AT4 phase, mechanically alloying the mixture to form the phase of intermetallic compound of the composition A5T19 in addition to the AT3 and AT4 phases, and subsequently mixing together or mechanically alloying the resulting alloy and an alloy containing AT5 phase.

3 Claims, 2 Drawing Sheets

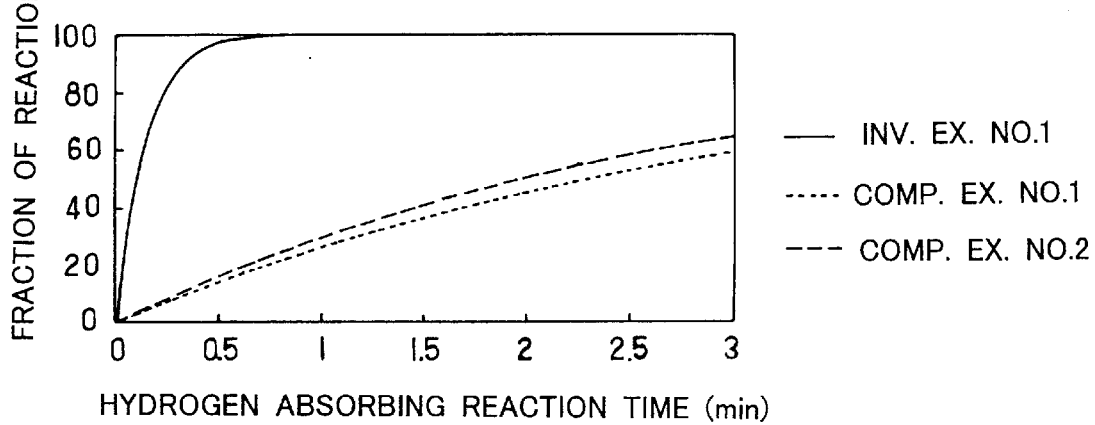
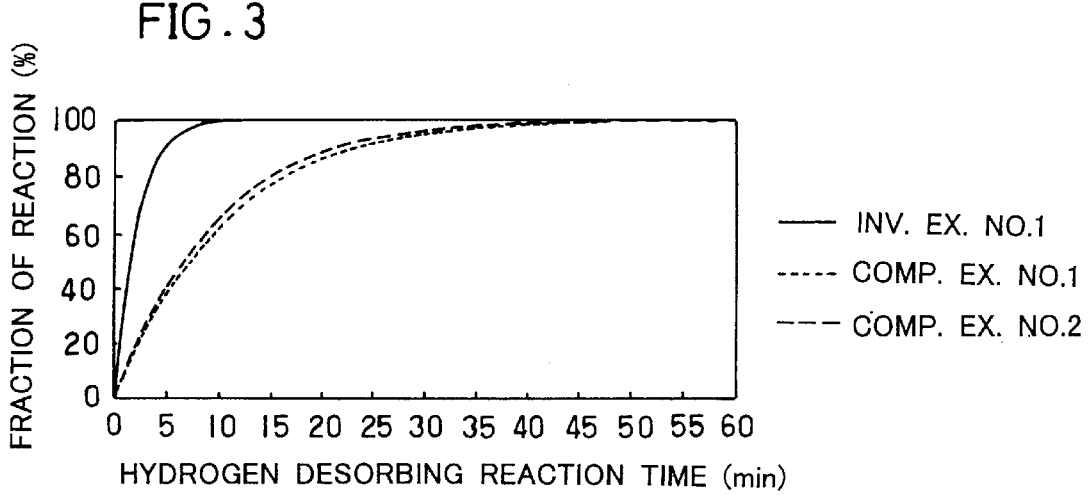

HYDROGEN ABSORBING ALLOYS AND PROCESS FOR PRODUCING SAME

FIELD OF THE INVENTION

The present invention relates to hydrogen absorbing alloys which reversibly react with a large quantity of hydrogen with heat of reaction.

BACKGROUND OF THE INVENTION

Attention has been directed to clean hydrogen energy in recent years owing to the depletion of fossil fuels such as petroleum and global environmental problems due to increases in carbon dioxide. In view of the situation, hydrogen absorbing alloys which are reversibly reactive with a large quantity of hydrogen with heat of reaction are regarded as indispensable hydrogen storage media and energy conversion media.

Ever since LaNi5 alloy of CaCu5-type crystal structure was disclosed (JP-B-34315/1974), various hydrogen absorbing alloys of the CaCu5-type having the same structure as the disclosed alloy have heretofore been proposed (see, for example, JP-B-28626/1984).

However, this LaNi5 hydrogen absorbing alloy has the problem of being low in hydrogen gas absorbing-desorbing reaction rate. Accordingly, the alloy is usable free of trouble as a hydrogen storage medium for fuel sources, such as fuel cells, wherein the frequency of hydrogen absorption or desorption is generally once every hour, but fails to fully exhibit its performance because of the low reaction rate when used with a hydrogen absorption or desorption frequency of several times per hour as is the case with heat pumps.

To overcome this drawback, an MmNi5 alloy (Mm: misch metal) is provided in which Ni is partly replaced by Mn to thereby enhance the activity of the alloy on hydrogen and improve the reaction rate (see, for example, JP-B-10543/1986).

This alloy nevertheless is not only limited in composition but also has the drawback of failing to exhibit other important characteristics required of hydrogen absorbing alloys, e.g., the reversibility of reaction and hydrogen absorption-desorption cycle life characteristics.

An object of the present invention is to provide a hydrogen absorbing alloy which is increased in reaction rate without being restricted in composition and which is unimpaired in the reversibility of reaction and hydrogen absorption-desorption cycle life characteristics.

SUMMARY OF THE INVENTION

To fulfill the object, the present invention provides a hydrogen absorbing alloy which contains the phase of an intermetallic compound represented by the formula A5T19 wherein A is at least one element selected from the group consisting of La, Ce, Pr, Sm, Nd, Mm (misch metal), Y, Gd, Ca, Mg, Ti, Zr and Hf, T is at least one element selected from the group consisting of B, Bi, Al, Si, Cr, V, Mn, Fe, Co, Ni, Cu, Zn, Sn and Sb, and the composition is expressed in atomic ratio.

In addition to the A5T19 phase, the phase of another intermetallic compound having a CaCu5-type crystal structure and represented by the formula AT5 can be present in the hydrogen absorbing alloy of the present invention.

The hydrogen absorbing alloy containing the phase of an intermetallic compound represented by the formula A5T19 can be prepared by mixing an alloy containing the phase of an intermetallic compound represented by the formula AT3 with an alloy containing the phase of an intermetallic compound represented by the formula AT4, and mechanically alloying the mixture.

Alternatively, the hydrogen absorbing alloy can be prepared by mechanically alloying an alloy containing the phase of an intermetallic compound represented by the formula AT3 and an alloy containing the phase of an intermetallic compound represented by the formula AT4 and the phase of an intermetallic compound represented by the formula AT5.

BRIEF DESCRIPTION OF THE DRAWINGS

FIG. 2 is a graph showing the measurements of hydrogen absorbing reaction rate obtained in Example 1; and FIG. 3 is a graph showing the measurements of hydrogen desorbing reaction rate obtained in Example 1.

DETAILED DESCRIPTION OF THE INVENTION

Figure 1:
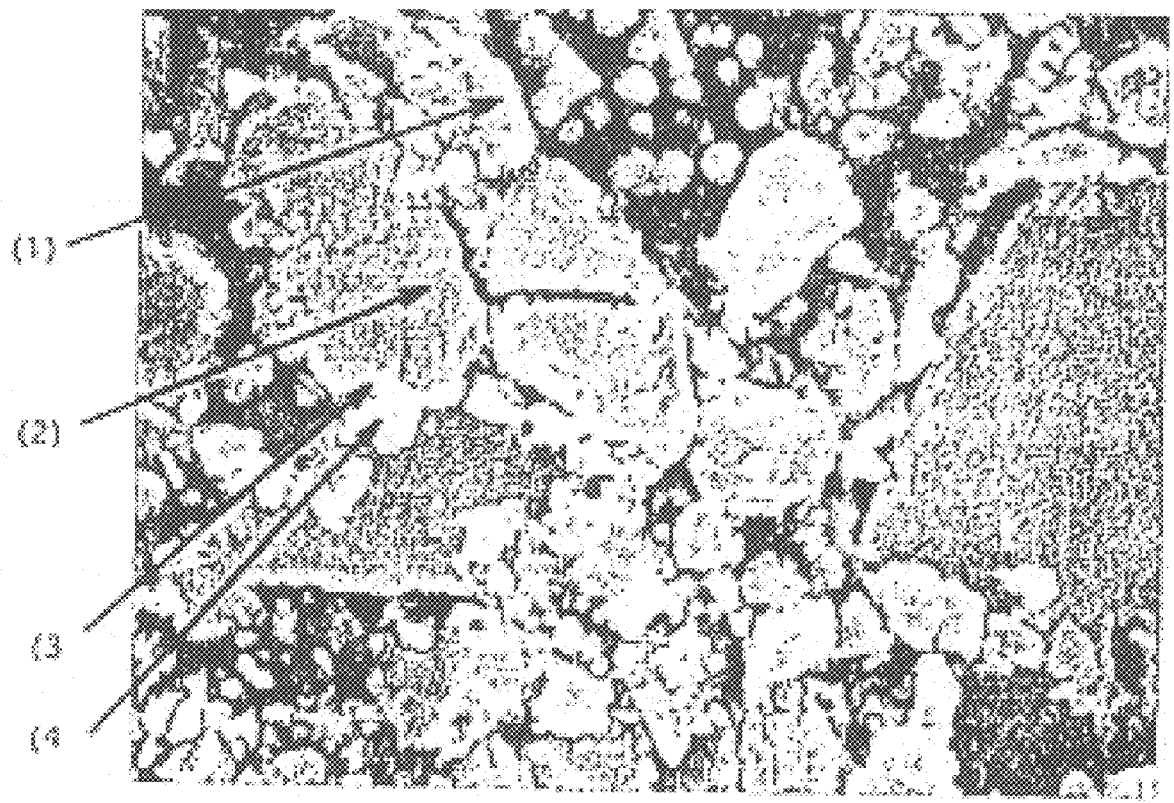
FIG. 1 is a photograph of the structure of a hydrogen absorbing alloy of the invention taken by a scanning electron microscope (SEM)

The inventors have found that the phase of intermetallic compound of the formula A5T19 is formed by the non-equilibrium alloying process of the mechanical alloying treatment to be described below. The phase can be said to be an entirely novel alloy phase which is not present in the structures of the conventional hydrogen absorbing alloys. Although the phase of intermetallic compound having the composition (in atomic ratio) of A5T19 still remains to be specifically clarified with respect to the crystal structure, the phase is distinguished from the phases of other intermetallic compounds by a definite boundary and is in a substantially uniform state in its entirety.

Hydrogen absorbing alloys include two-component alloys such as LaNi5, Mg2Ni, TiFe, ZrMn2, TiCr2 and TiMn2 and various multi-component alloys prepared by partially replacing the component metal of these alloys by other metal or by adding other metals. The present invention is not limited to hydrogen absorbing alloys of particular type such as the CaCu5 type; the novel A5T19 phase can be made to be present in any of two-component or multi-component hydrogen absorbing alloys.

The hydrogen absorbing alloy containing the A5T19 phase has an overall composition, for example, of A/T=1:3 to 1:6 when expressed in atomic ratio in the case where the alloy, for example LaNi5 alloy, contains the phase of an intermetallic compound having a CaCu5-type crystal structure and the composition AT5.

While the phase A5T19 is effective for giving an improved reaction rate even if present in a very small amount, it is desired that the phase should be present in an amount of about 0.1 to about 5 vol. %.

Although the composition (A/T) of the hydrogen absorbing alloy containing the A5T19 phase differs with the kind of hydrogen absorbing alloy used, the composition is, for example, 1:0.5 to 1:4 in atomic ratio when Mg2Ni alloy is used, 1:1 to 1:4 in atomic ratio in the case of TiFe alloy, 1:2 to 1:4 in atomic ratio in the case of ZrMn2 alloy, 1:2 to 1:4 in atomic ratio in the case of TiCr2 alloy, or 1:2 to 1:4 in atomic ratio in the case of TiMn2 alloy.

For example, a hydrogen absorbing alloy containing the A5T19 phase and AT5 phase can be prepared by the following procedure. First, an alloy containing the phase of an intermetallic compound having the composition AT3 is mixed with an alloy containing the phase of an intermetallic compound having the composition AT4, and the mixture is mechanically alloyed, whereby the phase of an intermetallic compound having the composition A5T19 is formed in addition to the phases AT3 and AT4. Subsequently, the resulting alloy and an alloy containing the phase of an intermetallic compound having the composition AT5 are mixed together or mechanically alloyed to obtain a hydrogen absorbing alloy containing the A5T19 and AT5 phases.

With the above process, the A5T19 phase is formed first, and the resulting alloy is thereafter mixed with an alloy of the AT5 phase, or the two alloys are mechanically alloyed. However, a hydrogen absorbing alloy containing the A5T19 phase and AT5 phase can be prepared by a single step by mechanically alloying an alloy containing the phase of an intermetallic compound having the composition AT3 and an alloy containing the phase of an intermetallic compound having the composition AT4 and the phase of an intermetallic compound having the composition AT5.

The hydrogen absorbing alloy of the present invention contains in its structure the phase of an intermetallic compound having the composition A5T19, which gives enhanced activity to the alloy to result in an increased reaction rate.

Description of the Preferred Embodiments

The processes for preparing hydrogen absorbing alloys of the invention and the reaction rate characteristics of the alloys will be described below with reference to specific examples.

EXAMPLE 1

Preparation of Hydrogen Absorbing Alloy having A5T19 Phase (La5Ni19 Phase in this Example)

A metal material adjusted to an La/Ni atomic ratio of 1:3 was melted in an arc furnace and then allowed to cool to obtain an alloy comprising LaNi3 phase, which will be referred to as "alloy (a)".

A metal material adjusted to an La/Ni atomic ratio of 1:4 was melted in the arc furnace and then allowed to cool to obtain an alloy comprising LaNi4 phase, which will be referred to as "alloy (b)".

A metal material adjusted to an La/Ni atomic ratio of 1:5 was melted in the arc furnace and then allowed to cool to obtain an alloy comprising LaNi5 phase, which will be referred to as "alloy (c)".

Alloy (a) of 100 g and alloy (b) of 100 g were placed into a planetary ball mill containing steel balls, and subjected to a mechanical alloying treatment at room temperature in an argon gas atmosphere for 10 hours to prepare an alloy composed of LaNi3 phase, LaNi4 phase and La5Ni19 phase. This alloy will be referred to as "alloy (d)".

Alloy (d) of 10 g and alloy (c) of 100 g were mixed together, placed into a planetary ball mill containing steel balls, and subjected to a mechanical alloying treatment at room temperature in an argon gas atmosphere for 10 hours to prepare an alloy composed of LaNi3 phase, LaNi4 phase, La5Ni19 phase and LaNi5 phase. The second mechanical alloying treatment produced in this alloy an interface where the La5Ni19 phase and the LaNi5 phase are joined together. The alloy will be referred to as "Invention Example No. 1".

Recognition of Presence of A5T19 Phase (La5Ni19 Phase in this Example)

FIG. 1 shows the structure (X1000) of the alloy of Invention Example No. 1 as photographed under a scanning electron microscope (SEM). Five samples were taken from each of the grains indicated at (1) to (4) in FIG. 1 and checked for composition by electron beam probe microanalysis (EPMA). Table 1 shows the result of the analysis.

TABLE 1

| | Positions | | | |
|---|---|---|---|---|
| No | (1) | (2) | (3) | (4) |
| 1 | LaNi2.97 | LaNi4.90 | LaNi3.83 | LaNi4.00 |
| 2 | LaNi3.05 | LaNi5.00 | LaNi3.78 | LaNi3.97 |
| 3 | LaNi3.03 | LaNi4.82 | LaNi3.80 | LaNi3.99 |
| 4 | LaNi2.98 | LaNi5.28 | LaNi3.79 | LaNi4.01 |
| 5 | LaNi3.00 | LaNi5.00 | LaNi3.80 | LaNi4.03 |
| Average | LaNi3.01 | LaNi5.00 | LaNi3.80 =La5Ni19 | LaNi4.00 |

According to the result of EPMA listed in Table 1, the five samples of each grain gave slightly varying data, whereas the variations are attributable to the errors inevitably involved in the analysis. The grain at position (1) is substantially found to be LaNi3 phase, the grain at position (2) to be LaNi5 phase, the grain at position (3) to be La5Ni19 phase, and the grain at position (4) to be LaLi4 phase.

Hydrogen Absorption and Desorption Tests

Alloy (c) was used as a comparative example and checked for reaction rate in the processes of hydrogen gas absorption and desorption. The alloy will be referred to as "Comparative Example No. 101".

Alloy (a) of 5 g, alloy (b) of 5 g and alloy (c) of 100 g were mixed together to prepare an alloy comprising LaNi3 phase, LaNi4 phase and LaNi5 phase for use as another comparative example. This alloy will be referred to as "Comparative Example No. 102".

The alloys of Invention Example No. 1 and Comparative Examples No. 101 and No. 102 were each subjected to hydrogen gas absorption and desorption tests and checked for reaction rate.

For the hydrogen absorption test for measuring the reaction rate in the process of absorbing hydrogen, a gas container having a capacity of about 300 c.c. was evacuated at a temperature of 20° C., and 5g of the hydrogen absorbing alloy was packed in a sample container of about 5 cc which is connected with the gas container through a stop valve. Subsequently hydrogen gas of 10 atm was supplied to the gas container at the temperature of 20° C., followed by opening the valve, and the hydrogen absorbing reaction rate was measured. FIG. 2 shows the result.

For the hydrogen desorption test for determining the reaction rate in the process of desorbing the absorbed hydrogen, the hydrogen gas was released at 20° C. into the gas container at 1 atm from the sample container filled with 10 atm of hydrogen gas, and the hydrogen desorbing reaction rate was measured. FIG. 3 shows the result.

Table 2 shows the structures of the alloy specimens of Invention Example No. 1, and Comparative Examples No. 101 and No. 102 with respect to phase and the time required for these specimens to complete 90% of the hydrogen gas absorbing or desorbing reaction.

TABLE 2

| | Phase of alloy structure | Time required for 90% reaction (min.) | |
|---|---|---|---|
| | | Absorption | Desorption |
| Inv. Ex. No. 1 | LaNi3, LaNi4, La5Ni19, LaNi5 | 0.35 | 4.5 |
| Comp. Ex. No. 101 | LaNi5 | 10 | 24 |
| Comp. Ex. No. 102 | LaNi3, LaNi4, LaNi5 | 8 | 21 |

The test results reveal that the presence of La5Ni19 phase remarkably improves the reaction rate of the hydrogen gas absorbing and desorbing processes as will be apparent from a comparison between Invention Example No. 1 and Comparison Example No. 102.

EXAMPLE 2

In the AT5 phase to be referred to in this examples, "A" is La, and "T" is Ni partially replaced by "M". (Represented by "M" in this example is B, Bi, Al, Si, Sn, Sb, Cr, V, Mn, Fe, Co. Cu or Zn.)

A metal material adjusted to an La/Ni/M atomic ratio of 1:4.8:0.2 was melted in an arc furnace and then allowed to cool to obtain an alloy comprising LaNi4.8M0.2 phase, which will be referred to as "alloy (e)".

10 g of alloy (d) obtained in Example 1 and 100 g of alloy (e) were mixed together to prepare an alloy comprising LaNi3 phase, LaNi4 phase, La5Ni19 phase and LaNi4.8M0.2 phase. Since alloy (d) and alloy (e) are merely mixed together to obtain this alloy, the La5Ni19 phase is not joined to the LaNi4.8M0.2 phase at an interface. The alloys thus prepared when "M" is B, Bi, Al, Si, Sn, Sb, Cr, V, Mn, Fe, Co, Cu or Zn will be referred to respectively as "Invention Examples No. 11 to No. 23".

Next, 10 g of alloy (d) obtained in Example 1 and 100 g of alloy (e) were mixed together, then placed into a planetary ball mill containing steel balls, and subjected to a mechanical alloying treatment at room temperature in an argon gas atmosphere for 10 hours to prepare an alloy composed of LaNi3 phase, LaNi4 phase, La5Ni19 phase and LaNi4.8M0.2 phase. The second mechanical alloying treatment produced in this alloy an interface where the La5Ni19 phase and the LaNi4.8M0.2 phase were joined together. The alloys thus prepared when "M" is B, Bi, Al, Si, Sn, Sb, Cr, V, Mn, Fe, Co, Cu or Zn will be referred to respectively as "Invention Examples No. 24 to No. 36".

Alloys (e) were used as comparative examples. When "M" is B, Bi, Al, Si, Sn, Sb, Cr, V, Mn, Fe, Co, Cu or Zn, the alloys will be referred to respectively as "Comparative Examples No. 111 to No. 123".

The alloy specimens of Invention Examples No. 11 to No. 23, Invention Examples No. 24 to No. 36 and Comparative Examples No. 111 to No. 123 were tested in the same manner as in Example 1 to measure the time required to complete 90% of a hydrogen absorbing reaction. Table 3 shows the results.

TABLE 3

Time required for 90% hydrogen absorbing reaction (min.)

| M | Inv. Ex. No. 11–No. 23 Phases: LaNi3, LaNi4, LaNi4.8M0.2, La5Ni19 (no interface with LaNi4.8M0.2) | | Inv. Ex. No. 24–No. 36 Phases: LaNi3, LaNi4, LaNi4.8M0.2 La5Ni19 (interface with LaNi4.8M0.2) | | Comp. Ex. No. 111–No. 123 Phases: LaNi4.8M0.2 | |
|---|---|---|---|---|---|---|
| B  | No. 11 | 1.80 | No. 24 | 0.50 | No. 111 | 4.20 |
| Bi | No. 12 | 2.60 | No. 25 | 0.60 | No. 112 | 5.30 |
| Al | No. 13 | 2.50 | No. 26 | 0.80 | No. 113 | 3.80 |
| Si | No. 14 | 3.60 | No. 27 | 1.50 | No. 114 | 6.50 |
| Sn | No. 15 | 2.10 | No. 28 | 0.70 | No. 115 | 4.10 |
| Sb | No. 16 | 3.60 | No. 29 | 0.90 | No. 116 | 6.80 |
| Cr | No. 17 | 3.40 | No. 30 | 0.80 | No. 117 | 6.80 |
| V  | No. 18 | 2.30 | No. 31 | 0.65 | No. 118 | 5.70 |
| Mn | No. 19 | 1.70 | No. 32 | 0.30 | No. 119 | 2.20 |
| Fe | No. 20 | 3.70 | No. 33 | 0.35 | No. 120 | 4.70 |
| Co | No. 21 | 1.20 | No. 34 | 0.15 | No. 121 | 2.00 |
| Cu | No. 22 | 1.80 | No. 35 | 1.60 | No. 122 | 4.40 |
| Zn | No. 23 | 2.10 | No. 30 | 0.85 | No. 123 | 3.60 |

The results in the table show that the hydrogen absorbing alloys of Invention Examples containing La5Ni19 phase are higher in reaction rate than those of Comparative Examples which are free from this phase. A comparison between Invention Examples No. 11 to No. 23 and Invention Examples No. 24 to No. 30 reveals that the presence of an interface between the La5Ni19 phase and the LaNi4.8M0.2 phase joined thereto is desirable for achieving higher reaction rates.

EXAMPLE 3

In the AT5 phase to be referred to in this example, "A" is La partially replaced by "M" (representing Ce, Nd, Pr, Sm, Ca, Mg, Ti, Zr, Hf, Y or Gd), and "T" is Ni.

A metal material adjusted to an La/M/Ni atomic ratio of 0.9:0.1:5 was melted in an arc furnace and then allowed to cool to obtain an alloy comprising La0.9M0.1Ni5 phase, which will be referred to as "alloy (f)".

10 g of alloy (d) obtained in Example 1 and 100 g of alloy (f) were mixed together, then placed into a planetary ball mill containing steel balls, and subjected to a mechanical alloying treatment at room temperature in an argon gas atmosphere for 10 hours to prepare an alloy composed of LaNi3 phase, LaNi4 phase, La5Ni19 phase and La0.9M0.1Ni5 phase. The second mechanical alloying treatment produced in this alloy an interface where the La5Ni19 phase and the La0.9M0.1Ni5 phase were joined together. The alloys thus prepared when "M" is Ce, Nd, Pr, Sm, Ca, Mg, Ti, Zr, Hf, Y or Gd will be referred to respectively as "Invention Examples No. 41 to No. 51".

Alloys (f) were used as comparative examples. When "M" is Ce, Nd, Pr, Sm, Ca, Mg, Ti, Zr, Hf, Y or Gd, the alloys will be referred to respectively as "Comparative Examples No. 141 to No. 151".

The alloy specimens of Invention Examples No. 41 to No. 51 and Comparative Examples No. 141 to No. 151 were tested in the same manner as in Example 1 to measure the time required to complete 90% of a hydrogen absorbing reaction. Table 4 shows the results.

TABLE 4

Time required for 90% hydrogen absorbing reaction. (min.)

| M | Inv. Ex. No. 41–No.51 Phases: LaNi3, LaNi4, La0.9M0.1Ni5, La5Ni19, (interface with La0.9M0.1Ni5) | | Comp. Ex. No.141–No.151 Phases: La0.9M0.1Ni5 | |
|---|---|---|---|---|
| Ce | No. 41 | 2.60 | No. 141 | 14.30 |
| Nd | No. 42 | 3.20 | No. 142 | 7.80 |
| Pr | No. 43 | 4.10 | No. 143 | 5.60 |
| Sm | No. 44 | 3.50 | No. 144 | 12.60 |
| Ca | No. 45 | 1.80 | No. 145 | 8.90 |
| Mg | No. 46 | 2.30 | No. 146 | 9.40 |
| Ti | No. 47 | 5.20 | No. 147 | 9.60 |
| Zr | No. 48 | 4.30 | No. 148 | 10.50 |
| Hf | No. 49 | 4.50 | No. 149 | 11.30 |
| Y | No. 50 | 2.80 | No. 150 | 7.90 |
| Gd | No. 51 | 3.50 | No. 151 | 8.30 |

The results in the table show that even when the La is partially replaced by other element, the hydrogen absorbing alloys of Invention Examples containing La5Ni19 phase are greatly improved in reaction rate over those of Comparative Examples which are free from this phase.

The hydrogen absorbing alloys of Example 3, although having an interface between the La5Ni19 phase and the La0.9M0.1Ni5 phase, are on the average longer than Invention Examples No. 24 to No. 30 of Example 2 in reaction time. This is thought attributable to an elevated equilibrium pressure resulting from the replacement in La in the case of Example 3 and reducing the hydrogen pressure difference which provides a driving force for the reaction.

EXAMPLE 4

In the AT5 phase to be referred to in this example, "A" is Mm (misch metal comprising 20 wt. % of La, 50 wt. % of Ce, 20 wt. % of Nd, 5 wt. % of Sm and 2 wt. % of Pr, and further containing 3 wt.% of Al, Mg and Fe combined), and "T" is Ni partially replaced by Al.

A metal material adjusted to an Mm/Ni/Al atomic ratio of 1:4.5:0.5 was melted in an arc furnace and then allowed to cool to obtain an alloy comprising MmNi4.5Al0.5 phase, which will be referred to as "alloy (g)".

10 g of alloy (d) obtained in Example 1 and 100 g of alloy (g) were mixed together, then placed into a planetary ball mill containing steel balls, and subjected to a mechanical alloying treatment at room temperature in an argon gas atmosphere for 10 hours to prepare an alloy composed of LaNi3 phase, LaNi4 phase, La5Ni19 phase and MmNi4.5Al0.5 phase. The second mechanical alloying treatment produced in this alloy an interface where the La5Ni19 phase and the MmNi4.5Al0.5 phase were joined together. The alloy thus prepared will be referred to as "Invention Example No. 52".

Alloy (g) was used as a comparative example. The alloy will be referred to as "Comparative Example No. 152".

The alloy specimens of Invention Example No. 52 and Comparative Example No. 152 were tested in the same manner as in Example 1 to measure the time required to complete 90% of a hydrogen absorbing reaction. Table 5 shows the results.

TABLE 5

| | Phase of alloy structure | Time required for 90 hydrogen absorbing reaction (min.) |
|---|---|---|
| Inv. Ex. No. 52 | LaNi3, LaNi4, MmNi4.5A10.5, La5Ni19 (interface with MmNi4.5A10.5) | 3.20 |
| Comp. Ex. No. 152 | MmNi4.5A10.5 | 5.70 |

The results given in the table reveal that even when Mm is selected for "A", with Ni serving as "T" and partially replaced by Al, the hydrogen absorbing alloy of Invention Example containing the La5Ni19 phase is higher in reaction rate than the alloy of Comparative Example free from this phase.

Although the misch metal preferably comprises a mixture of 100% rare-earth elements, it is thought acceptable that the metal contain the elements Al, Mg, Fe, etc. in a combined amount of up to about 10%.

EXAMPLE 5

In the AT3 phase, AT4 phase and A5T19 phase to be referred to in this example, "A" is La, and "T" is Ni partially replaced by "M" (representing B, Bi, Al, Si, Cr, V, Mn, Fe, Co, Cu, Zn, Sn or Sb).

A metal material adjusted to an La/Ni/M atomic ratio of 1:3:1 was melted in an arc furnace and then allowed to cool to obtain an alloy comprising LaNi3M phase, which will be referred to as "alloy (h)".

100 g of alloy (a) obtained in Example 1 and 100 g of alloy (h) were placed into a planetary ball mill containing steel balls, and subjected to a mechanical alloying treatment at room temperature in an argon gas atmosphere for 10 hours to prepare an alloy composed of La(Ni-M)3 phase, LaNi3M phase and La5(Ni-M)19 phase. This alloy will be referred to as "alloy (i)".

10 g quantity of alloy (i) and 100 g of alloy (c) obtained in Example 1 were mixed together, placed into a planetary ball mill containing steel balls, and subjected to a mechanical alloying treatment at room temperature in an argon gas atmosphere for 10 hours to prepare an alloy composed of La(Ni-M)3 phase, LaNi3M phase, La5(Ni-M)19 phase and LaNi5 phase. The second mechanical alloying treatment produced in this alloy an interface where the La5(Ni-M)19 phase and the LaNi5 phase are joined together. The alloys thus prepared when "M" is B, Bi, Al, Si, Sn, Sb, Cr, V, Mn, Fe, Co, Cu or Zn will be referred to respectively as "Invention Examples No. 61 to No. 73".

The alloy specimens of Invention Examples No. 61 to No. 73 were tested in the same manner as in Example 1 to measure the time required to complete 90% of a hydrogen absorbing reaction. Table 6 shows the results.

For comparison with these Invention Examples, Table 6 also shows the result attained by Comparative Examples No. 111 to No. 123 in Example 2.

TABLE 6

Time required for 90% hydrogen absorbing reaction (min.)

| M | Inv. Ex. No.61–No.73 Phases: La(Ni-M)3; LaNi3M, LaNi5, La5(Ni-M)19, (interface with LaNi5) | | Comp. Ex. No.111–No.123 Phases: LaNi4.8M0.2 | |
|---|---|---|---|---|
| B | No. 61 | 0.55 | No. 111 | 4.20 |
| Bi | No. 62 | 0.80 | No. 112 | 5.30 |
| Al | No. 63 | 1.50 | No. 113 | 3.80 |
| Si | No. 64 | 2.30 | No. 114 | 6.50 |
| Sn | No. 65 | 0.90 | No. 115 | 4.10 |
| Sb | No. 66 | 1.80 | No. 116 | 6.80 |
| Cr | No. 67 | 1.20 | No. 117 | 6.80 |
| V | No. 68 | 0.40 | No. 118 | 5.70 |
| Mn | No. 69 | 0.30 | No. 119 | 2.20 |
| Fe | No. 70 | 0.35 | No. 120 | 4.70 |
| Co | No. 71 | 0.14 | No. 121 | 2.00 |
| Cu | No. 72 | 1.30 | No. 122 | 4.40 |
| Zn | No. 73 | 1.45 | No. 123 | 3.60 |

The results listed reveal that the hydrogen absorbing alloys of Invention Examples containing the La5(Ni-M)19 phase are higher in reaction rate than those of Comparative Examples free from this phase.

EXAMPLE 6

In the AT3 phase, AT4 phase and A5T19 phase to be referred to in this example, "A" is La partially replaced by "M" (representing Ce, Nd, Pr, Sm, Ca, Mg, Ti, Zr, Hf, Y, Gd or Mm), and "T" is Ni. Mm comprises 20 wt. % of La, 50 wt. % of Ce, 20 wt. % of Nd, 5 wt. % of Sm and 2wt. % of Pr, and further contains 3 wt. % of Al, Mg and Fe combined.

A metal material adjusted to an La/M/Ni atomic ratio of 0.8:0.2:4 was melted in an arc furnace and then allowed to cool to obtain an alloy comprising La0.8M0.2Ni4 phase, which will be referred to as "alloy (j)".

100 g of alloy (a) obtained in Example 1 and 100 g of alloy (j) were placed into a planetary ball mill containing steel balls, and subjected to a mechanical alloying treatment at room temperature in an argon gas atmosphere for 10 hours to prepare an alloy composed of La(Ni-M)Ni3 phase, (La-M)Ni4M phase and (La-M)5Ni19 phase. This alloy will be referred to as "alloy (k)".

10 g of alloy (k) and 100 g of alloy (c) obtained in Example 1 were mixed together, placed into a planetary ball mill containing steel balls, and subjected to a mechanical alloying treatment at room temperature in an argon gas atmosphere for 10 hours to prepare an alloy composed of (La-M)Ni3 phase, (La-M)Ni4 phase, (La-M) 5Ni19 phase and LaNi5 phase. The second mechanical alloying treatment produced in this alloy an interface where the (La-M) 5Ni19 phase and the LaNi5 phase are joined together. The alloys thus prepared when "M" is Ce, Nd, Pr, Sm, Ca, Mg, Ti, Zr, Hf, Y, Gd or Mm will be referred to respectively as "Invention Examples No. 81 to No. 92".

The alloy specimens of Invention Examples No. 81 to No. 92 were tested in the same manner as in Example 1 to measure the time required to complete 90% of a hydrogen absorbing reaction. Table 7 shows the results.

For comparison with these Invention Examples, Table 7 also shows the results attained by Comparative Examples No. 141 to No. 151 in Example 3 and Comparative Example No. 152 in Example 4.

TABLE 7

Time required for 90% hydrogen absorbing reaction (min.)

| M | Inv. Ex. No.81–No.92 Phases: (La-M)Ni3. (La-M)Ni4, LaNi5, (La-M)5Ni19, (interface with LaNi5) | | Comp. Ex. No.141–No.152 Phases: La0.9M0.1Ni5 | |
|---|---|---|---|---|
| Ce | No. 81 | 0.75 | No. 141 | 14.30 |
| Nd | No. 82 | 0.70 | No. 142 | 7.80 |
| Pr | No. 83 | 1.20 | No. 143 | 5.60 |
| Sm | No. 84 | 1.80 | No. 144 | 12.60 |
| Ca | No. 85 | 1.30 | No. 145 | 8.90 |
| Mg | No. 86 | 1.50 | No. 146 | 9.40 |
| Ti | No. 87 | 1.60 | No. 147 | 9.60 |
| Zr | No. 88 | 0.80 | No. 148 | 10.50 |
| Hf | No. 89 | 0.90 | No. 149 | 11.30 |
| Y | No. 90 | 3.20 | No. 150 | 7.90 |
| Gd | No. 91 | 2.30 | No. 151 | 8.30 |
| Mm | No. 92 | 1.30 | No. 152 | 5.70 |

The results listed reveal that the hydrogen absorbing alloys of Invention Examples containing the (La-M)5Ni19 phase are higher in reaction rate than those of Comparative Examples free from this phase.

EXAMPLE 7

This example relates to a process for preparing a hydrogen absorbing alloy containing La5Ni19 phase by a single mechanical alloying treatment.

A metal material adjusted to an La/Ni atomic ratio of 1:4.8 was melted in an arc furnace and then allowed to cool to obtain an alloy comprising LaNi4 phase and LaNi5 phase in the former to latter ratio of 1:4 by weight (composition based on an La-Ni phase diagram). The alloy will be referred to as "alloy (m)".

20 g of alloy (a) obtained in Example 1 and 100 g of alloy (m) were placed into a planetary ball mill containing steel balls, and subjected to a mechanical alloying treatment at room temperature in an argon gas atmosphere for 10 hours to prepare an alloy comprising 80 g of LaNi5 phase, and LaNi3, LaNi4 phase and La5Ni19 phase in a combined amount of 40 g. The alloy had an interface where the La5Ni19 phase and the LaNi5 phase were joined together. The alloy will be referred to as "Invention Example No. 95".

The alloy specimen of Invention Example No. 95 was tested for reaction rate in hydrogen gas absorption and desorption processes in the same manner as in Example 1. Table 8 shows the time required to complete 90% of the hydrogen gas absorbing or desorbing reaction. For comparison, Table 8 also shows the result achieved by Comparative Examples No. 101 and No. 102 in Example 1.

TABLE 8

| | Phase of alloy structure | Time required for 90% reaction (min.) | |
|---|---|---|---|
| | | Absorption | Desorption |
| Inv. Ex. No.95 | LaNi3, LaNi4, La5Ni19, LaNi5 | 0.35 | 5 |

TABLE 8-continued

| | Phase of alloy structure | Time required for 90% reaction (min.) | |
|---|---|---|---|
| | | Absorption | Desorption |
| Comp. Ex. No.101 | LaNi5 | 10 | 24 |
| Comp. Ex. No.102 | LaNi3, LaNi4, LaNi5 | 8 | 21 |

The test results reveal that the presence of the La5Ni19 phase remarkably improves the reaction rate of the hydrogen gas absorption and desorption processes.

Hydrogen absorbing alloys containing the phase of an intermetallic compound of the formula A5T19 can be produced by the non-equilibrium alloying process of the invention.

The hydrogen absorbing alloy of the invention containing the phase of intermetallic compound A5T19 reacts with hydrogen at a high rate in the hydrogen absorption-desorption process, and is therefore shortened in reaction completion time and especially advantageous for uses wherein hydrogen is absorbed or desorbed as frequently as several times per hour as in heat pumps. Unlike the conventional hydrogen absorbing alloys, the present alloy is not restricted in composition and is unimpaired in the reversibility of reaction and hydrogen absorption-desorption cycle life characteristics.

What is claimed is:

1. A process for producing a hydrogen absorbing alloy characterized by mixing together an alloy containing a phase of an intermetallic compound represented by formula AT3 and an alloy containing a phase of an intermetallic compound represented by formula AT4, mechanically alloying the mixture to prepare an alloy containing in a portion of the structure thereof a phase of an intermetallic compound represented by formula A5T19, and mixing the resulting alloy with an alloy containing a phase of an intermetallic compound represented by formula AT5, A in the formulae being at least one element selected from the group consisting of La, Ce, Pr, Sm, Nd, Mm (misch metal), Y, Gd, Ca, Mg, Ti, Zr and Hf, T in the formulae being at least one element selected from the group consisting of B, Bi, Al, Si, Cr, V, Mn, Fe, Co, Ni, Cu, Zn, Sn and Sb, the compounds being represented by the respective formulae being expressed in atomic ratio.

2. A process for producing a hydrogen absorbing alloy characterized by mixing together an alloy containing a phase of an intermetallic compound represented by formula AT3 and an alloy containing a phase of an intermetallic compound represented by formula AT4, mechanically alloying the mixture to prepare an alloy containing in a portion of the structure thereof a phase of an intermetallic compound represented by formula A5T19, and mechanically alloying the resulting alloy and an alloy containing a phase of an intermetallic compound represented by formula AT5, A in the formulae being at least one element selected from the group consisting of La, Ce, Pr, Sm, Nd, Mm (misch metal), Y, Gd, Ca, Mg, Ti, Zr and Hf, T in the formulae being at least one element selected from the group consisting of B, Bi, Al, Si, Cr, V, Mn, Fe, Co, Ni, Cu, Zn, Sn and Sb, the compounds being represented by the respective formulae being expressed in atomic ratio.

3. A process for producing a hydrogen absorbing alloy characterized by mechanically alloying an alloy containing a phase of an intermetallic compound represented by formula AT3 and an alloy containing a phase of an intermetallic compound represented by formula AT4 and a phase of an intermetallic compound represented by formula AT5 to form a phase of an intermetallic compound represented by formula A5T19 in a portion of the structure of the resulting alloy, A in the formulae being at least one element selected from the group consisting of La, Ce, Pr, Sm, Nd, Mm (misch metal), Y, Gd, Ca, Mg, Ti, Zr and Hf, T in the formulae being at least one element selected from the group consisting of B, Bi, Al, Si, Cr, V, Mn, Fe, Co, Ni, Cu, Zn, Sn and Sb, the compounds being represented by the respective formulae being expressed in atomic ratio.

* * * * *